United States Patent
Liang (10) Patent No.: US 7,099,671 B2
(45) Date of Patent: Aug. 29, 2006

(54) COLLABORATIVE MECHANISM OF ENHANCED COEXISTENCE OF COLLOCATED WIRELESS NETWORKS

(75) Inventor: Jie Liang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 562 days.

(21) Appl. No.: 10/011,221

(22) Filed: Oct. 21, 2001

(65) Prior Publication Data

Related U.S. Application Data (60) Provisional application No. 60/262,008, filed on Jan. 16, 2001.

(51) Int. Cl.
*H04Q 7/20* (2006.01)

(52) U.S. Cl. .................. 455/450; 455/451; 455/452.1; 455/452.2; 455/454

(58) Field of Classification Search ............... 455/450, 455/451, 452.1, 452.2, 454, 509, 512, 41.2
See application file for complete search history.

(56) References Cited

U.S. PATENT DOCUMENTS

| 4,987,571 | A | * | 1/1991 | Haymond et al. ........... 370/445 |
| 6,510,322 | B1 | * | 1/2003 | Schulte-Kellinghaus .... 455/450 |
| 6,560,443 | B1 | * | 5/2003 | Vaisanen et al. .............. 455/73 |
| 6,615,050 | B1 | * | 9/2003 | Tiedemann et al. ......... 455/522 |
| 2002/0061031 | A1 | * | 5/2002 | Sugar et al. ................. 370/466 |
| 2002/0141376 | A1 | * | 10/2002 | Kandala ..................... 370/348 |

* cited by examiner

*Primary Examiner*—Matthew Anderson
*Assistant Examiner*—Minh Dao
(74) *Attorney, Agent, or Firm*—Steven A. Shaw; W. James Brady; Frederick J. Telecky, Jr.

(57) ABSTRACT

A digital device 310 with a plurality of collocated wireless networks encounters inter-network interference if the collocated wireless networks operate in a common operating frequency. A coordinator unit 510, coupled to the plurality of wireless networks, provides a transmission reservation system wherein a wireless network with a need to transmit can request and receive a reservation for time to transmit. The coordinator unit 510 provides a way to schedule transmissions from the plurality of wireless networks and to reduce the probability of collisions.

20 Claims, 3 Drawing Sheets

COLLABORATIVE MECHANISM OF ENHANCED COEXISTENCE OF COLLOCATED WIRELESS NETWORKS

This application claims priority to the provisional application entitled "Proposal for Non-collaborative BT and 802.11 B MAC Mechanisms for Enhanced Coexistence", filed Jan. 16, 2001, Ser. No. 60/262,008.

FIELD OF THE INVENTION

This invention relates generally to communications networks and particularly to enhancing the performance of multiple wireless communications networks operating in a same frequency band, collocated in a small area.

BACKGROUND OF THE INVENTION

Radio frequency (RF) spectrum is a valuable commodity in today's world. There are more people desiring to use the RF spectrum than there is spectrum to go around, so use of the spectrum must be regulated. In many countries, the RF spectrum is regulated by governmental bodies. The Federal Communications Commission (FCC) regulates the RF spectrum in the United States.

The RF spectrum is regulated usually in one of two ways. A first way that governmental bodies regulates the RF spectrum is to sell portions of it to the highest bidder. The winning bidder, then has exclusive use of the particular portion of the RF spectrum that he has just purchased. This is way that RF spectrum for cellular telephones, television and radio channels are allocated. Single user allocations are the preferred method for applications where interference from other sources cannot be tolerated.

A second way that the government regulates RF spectrum usage is to create certain bands where anyone can use the RF spectrum as long as they comply with specified spectrum usage rules. For example, in the United States, the FCC has created three such bands. These bands are called the industrial, scientific, and medical (ISM) and the unified national information infrastructure (UNII) bands and are in the 900 MHz, 2.4 GHz, and 5.7 GHz portions of the RF spectrum. Anyone may use the spectrum in these bands as long as they are able to accept interference from other users and do not cause undue interference to other users.

The ISM and UNII bands have created a huge market for wireless consumer electronics products, such as cordless telephones, wireless computer products, and wireless computer networks. However, the popularity of the bands has resulted in a problem that many product developers did not anticipate, namely, performance degradation due to inter-product interference.

In wireless computer networks, the performance degradation is seen mainly in the network's data transfer rates. A wireless network today is capable of delivering a data transfer rate of 11 Mbps or more in an interference free environment, but if interference is introduced, the data transfer rate may drop to only a small fraction of the maximum.

Interference to a wireless computer network may come from many different forms. Sources of interference may include large appliances in the environment, other electronic devices such as pagers, cordless telephones, and microwave ovens, and other wireless computer networks. The relatively simple sources of interference such as appliances and pagers and telephones are relatively simple to deal with because their interference is periodic and is usually predictable. Because the interference is predictable, it is usually easy to avoid.

When multiple wireless computer networks are collocated, the wireless networks may interfere with one another. If the wireless computer networks are of the same type (the networks use a common technical standard), then there are often built-in mechanisms that permit the networks to remain operating at near optimal levels. However, if the wireless computers networks are of differing types, then there normally no built-in techniques that will permit the networks to work around each other.

Interference from wireless networks are more difficult to deal with due to the bursty nature of computer traffic and the fact the networks are often adaptive and can adjust their behavior depending on network conditions. The adaptive behavior often makes the interference worse because in many cases the network simply increases its transmission power when it detects a decrease in data rate. The increased transmission power results in a corresponding increase in the interference to other networks.

The collocation problem is at its worst when a single device has wireless network cards for multiple wireless networks installed. For example, a personal computer may have two (or more) wireless network interface cards installed inside it. A first card may be used with an IEEE 802.11 (802.11) wireless Ethernet network that permits the personal computer access to a company's corporate intranet and access to the Internet. A second card may be used with a Bluetooth (BT) network that permits the personal computer short-range access to personal digital assistants, printers, cellular telephones, etc.

Unfortunately, since the two network cards are often only a few inches (or less) from one another, when one card transmits, it often saturates the receiver of the other. This prevents the other card from receiving any information transmitted in its own network. A similar problem occurs when one card is receiving information, where the received information from one network may be so powerful that it obliterates any information intended for the other network.

One proposed solution for the collocation of multiple wireless computer networks in a single device involves regulating traffic flow from the networks with fixed priorities. This involves assigning different traffic classes in each of the networks a different priority and then allowing the traffic classes with higher priorities to transmit at the expense of lower priority traffic. However, with a fixed priority structure, it is very possible to have the higher priority traffic dominate access to the networks and starve the lower priority traffic. Additionally, by using fixed priorities, it is not possible to adjust the priorities to meet changing network conditions.

A need has therefore arisen for a solution that allows multiple wireless computer networks to collocate and at the same time, permit sufficient flexibility so that the solution itself may be adjusted to meet changing network conditions.

SUMMARY OF THE INVENTION

In one aspect, the present invention provides a method for controlling access to a wireless communications shared by multiple collocated wireless networks comprising receiving a reservation request from a collocated wireless network, deciding to grant or reject the reservation request, and providing the results of the decision to the requesting wireless network.

In another aspect, the present invention provides a method for sharing a wireless communications medium between multiple collocated wireless networks comprising a wireless network determining that it needs to transmit and the wireless network sending a reservation request corresponding to the transmission to a coordinator unit, the wireless network can transmit if the reservation request was granted and the wireless network must defer the transmission if the request was rejected.

The present invention provides a number of advantages. For example, a preferred embodiment of the present invention permits multiple wireless computer networks to collocate on a single digital device and share the available RF spectrum through the use of an arbitration unit that schedules usage of the RF spectrum for the wireless networks. Through the use of scheduling, the collisions of packets transmitted by the collocated networks are reduced.

Also, since present invention uses an arbitration unit that decides which network is granted permission to transmit, the present invention has the ability to adjust the decision making process used by the arbitration unit in a dynamic fashion to optimize network performance.

Additionally, the present invention uses an arbitration unit can be updated via software techniques, so that when additional networks are supported or changes are made to existing network technical standards, the arbitration unit can be easily upgraded.

Furthermore, in the case when only one of the collocated wireless networks is operating (transmitting), the wireless network does not suffer any performance penalties from the present invention. The wireless network will function as well as if it were the only wireless network located on the device.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Wireless networks have become extremely popular with users of digital equipment. They allow a degree of mobility and flexibility that has not been available until recently. A user with a digital device connected to a wireless network can roam freely within the operational range of the network without being encumbered by wires. Additionally, more sophisticated wireless networks permit configurations wherein multiple networks can be setup so that the user can transparently roam between the networks without noticing the change in networks taking place or needing to make any adjustments to the digital device.

Unfortunately, the popularity of wireless networks has also spawned a large number of incompatible wireless networks. In the majority of cases, a device that is configured to operate on one wireless network cannot operate on another. One solution for digital devices that are capable of supporting multiple network cards is to install multiple wireless network cards onto the digital device.

However, since the wireless networks are usually incompatible and often share the same radio frequency (RF) spectrum, typically only one network can be operational at one time. If multiple networks share the same RF spectrum, when one transceiver (a combination transmitter and receiver) in a digital device containing multiple transceivers transmits, the transmission will saturate the receivers in each of the other transceivers. With their receivers saturated, the other transceivers will not be able to receive any packets, or if they are currently receiving a packet, then the packet will be damaged by the transmitted packet from the transmitting transceiver.

The present invention discloses a method for permitting multiple wireless networks to collocate within the same general area (the same digital device). The method permits the multiple networks to continuously operate without suffering a large performance decrease. While the discussion will specifically discuss two specific types of wireless networks, the ideas presented in the present invention has application in other types of wireless networks and to more than two collocated wireless networks. Therefore, the present invention should not be construed as being limited solely to the two wireless networks discussed herein.

Networks adhering to the IEEE 802.11 technical standard are among the most widely available wireless network today. The 802.11 wireless network operates in the 2.4 GHz ISM RF spectrum band and provides up to 11 Mbps of data transfer rate and a more advanced version, IEEE 802.11a, operating in the 5.7 UNII band provides up to 54 Mbps of data transfer rate. The 802.11 wireless network is specified in a technical standard, "ANSI/IEEE Std 802.11, 1999 Edition; Information technology—Telecommunications and information exchange between systems—Local and metropolitan area networks—Specific requirements. Part 11: Wireless LAN Medium Access Control (MAC) and Physical Layer (PHY) Specifications" which is incorporated herein by reference. An 802.11 wireless network is intended as a wireless replacement to the wired data network, therefore, it provides a high data transfer rate and a relatively large operating area (a high transmitted signal power level).

Figure 1:
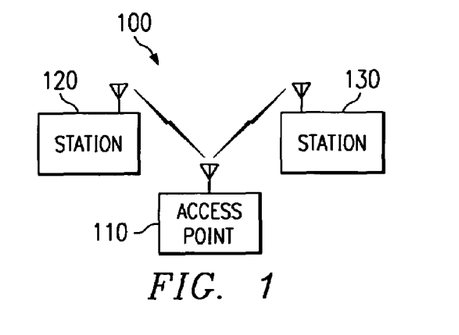
FIG. 1 illustrates a typical (prior art) configuration for an IEEE 802.11 wireless local area network.

Referring now to FIG. 1, a diagram (prior art) of a typical wireless network configuration according to the 802.11 technical standard. Note that FIG. 1 displays one possible configuration of an 802.11 wireless network out of the many different configurations that are possible. FIG. 1 illustrates a wireless network 100 comprised of an access point 110 that is wirelessly connected to a first station 120 and a second station 130.

An 802.11 wireless network provides two different modes of communications. A first mode of communications is known as contention-free communications. Contention-free communications occurs during a contention-free period and is controlled by a point coordinator. The point coordinator is typically located inside an access point. During contention-free communications, a station can communicate after it has received a poll-frame from the access point (the point coordinator). After the station receives the poll-frame from the access point, it is free to transmit for a time duration that is specified in the poll-frame.

A second mode of communications is known as contention access communications. Contention access communications occurs during a contention period. Contention access communications is a distributed communications methodology and there is no controller to control communications. If a station wishes to communicate, it must wait until the communications medium is idle. After the communications medium becomes idle, the station is required to wait a prespecified amount of time referred to as a Distributed Coordinating Function (DCF) interframe space (DIFS) period. The wait of a DIFS period is required to ensure that the stations involved in the previous communications exchange have completed their communications. Note that the 802.11 technical standard defines two types of idle media, a physical idle when there are no transmissions on the medium, and a virtual idle when there are no expected transmissions. Both types of idle must be met in order for the communications medium to be considered idle.

Once the communications medium becomes idle and the station waits the requisite DIFS period, a backoff period starts. During the backoff period, a backoff timer decrements one each time an idle network slot passes. The station must wait until the backoff timer reaches zero prior to transmitting. The duration of the backoff period (the value in the backoff timer) is a randomly generated value that is specified by a contention window. The contention window is a range from (0, CW) that specifies the possible values for the backoff period. When the backoff timer reaches zero, the station is permitted to transmit. Since contention access communications is not a controlled form of communications, there is a non-zero probability that packets transmitted using contention access communications will collide with other packets.

Should a collision take place, the stations involved in the collision are required to repeat the backoff procedure with larger values for the contention window. After each collision, the value CW is doubled, resulting in a doubling of the contention window size. Should collisions continue to occur, the value of CW will exceed a maximum permitted value, CWmax. If this is the case, the CW will remain at the maximum permitted value until the transmissions succeed or the number of transmission attempts exceed a specified limit and the transmission is aborted.

Another wireless network standard is the Bluetooth (BT) special interest group (SIG) technical standard. Specified in the "Specification Volume 1: Specification of the Bluetooth System, Version 1.1, Feb. 22, 2001," which is incorporated herein by reference. BT wireless networks are intended as replacements for low data-rate wired connections, such as parallel and serial connections, and universal serial bus connections between digital devices. As such, BT wireless networks are typically small area networks (a low transmission power level).

Figure 2:
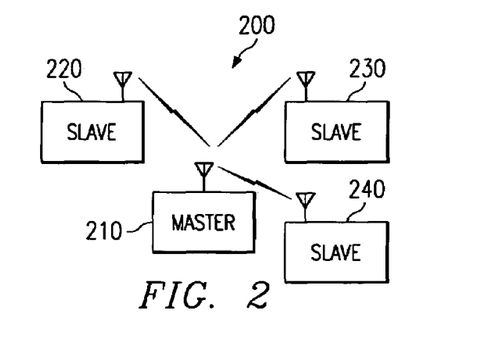
FIG. 2 illustrates a typical (prior art) configuration for a Bluetooth wireless network.

Referring now to FIG. 2, a diagram (prior art) of a typical wireless network configuration according to the BT SIG technical specifications. Note that FIG. 2 displays one possible configuration of a BT wireless network out of the many different configurations that are possible. FIG. 2 illustrates a BT wireless network 200 comprised of a master unit 210 and three slave units 220, 230, and 240. The master unit 210 is wirelessly connected to the three slave units. According to the BT SIG specifications, a slave unit cannot communicate unless it is specifically addressed in a packet from the master unit.

A BT network operates in the 2.4 GHz ISM band, along with 802.11 wireless LANs. It uses a frequency hopping, time-division duplex scheme with a slot length of 625 micro-seconds. The transmission pattern is as follows: the master unit and the slave units are granted alternating time slots. If a master unit is granted a time slot number 1, then the master unit can transmit during that time slot and all subsequent odd numbered time slots. Time slots dedicated to the master unit are referred to as master→slave time slots. The slave unit(s) are then assigned time slot number 2 and then all subsequent even numbered time slots. Time slots dedicated to the slave unit(s) are referred to as slave→master time slots. A unit, either master or slave(s), cannot transmit outside of its assigned time slots, without using special provisions provided for transmitting a packet of length greater than one time slot. A slave unit is only allowed to transmit after addressed by the master unit in previous master→slave slot.

A BT wireless network provides two different communications modes. A first mode, referred to as synchronous connection oriented (SCO), simulates a circuit switch connection between a master unit and a slave unit. SCO communications are scheduled well in advance of the actual communications instances and occur at regular intervals. The master unit 210 will setup a SCO link between itself and a slave unit and at periodic intervals, the master unit 210 will transmit to the slave unit using a master→slave time slot, who in turn, will transmit a response in the following slave→master time slot.

A second mode, referred to as asynchronous connectionless (ACL), provides packet switched connections between a master unit and a slave unit(s). The master unit can transmit to a single slave, a group of slaves or all slaves in a master→slave time slot. If a slave decodes that the transmission was intended for it (via decoding its address in the transmission), then it is permitted to transmit back to the master in the next slave→master time slot. There is no reply transmission if the transmission was not addressed to a specific slave, i.e., the transmission was a broadcast to all slave units.

Both 802.11 wireless LANs and BT wireless networks operate in the same 2.4 GHz ISM band. Accordingly, transmissions from an 802.11 wireless LAN will interfere with a BT wireless network and vice versa. The interference is especially problematic if a single digital device is simultaneously in both an 802.11 wireless LAN and a BT wireless network. When a digital device is collocated in both wireless networks, then when the digital device is transmitting a packet in one network, the transmission will saturate the receiver of the other network. This in effect "blinds" the receiver of the other network.

Figure 3:
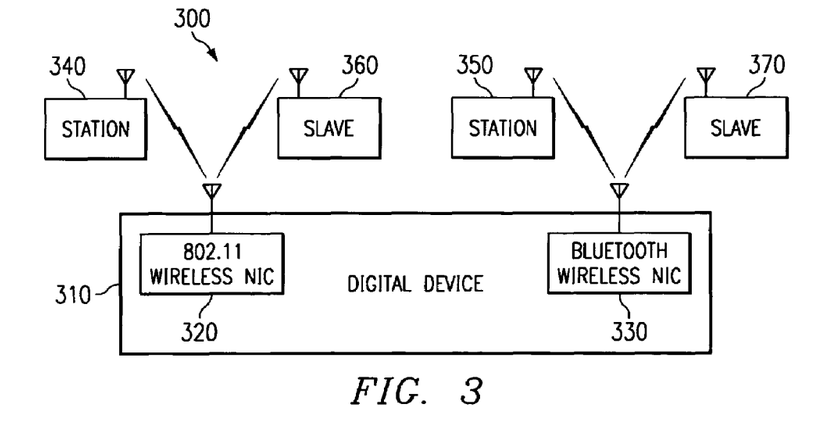
FIG. 3 illustrates a digital device with a collocated IEEE 802.11 wireless local area network and a Bluetooth wireless network.

Referring now to FIG. 3, a diagram illustrates a digital device 310 collocated with both an 802.11 wireless LAN and a BT wireless network. The digital device 310 may be (but not limited to) personal computers (PCs), personal digital assistants (PDAs), cellular and personal communications system (PCS) telephones, computer network gateways, handheld computers, and pen-based computers, or any other type of digital device that can connect to wireless networks. The digital device 310, as shown, contains two network interface cards (NICs). One NIC is for the 802.11 wireless network (802.11 NIC 320) and a second NIC is for the BT wireless network (BT NIC 330). In a typical application, the 802.11 NIC 320 is used to provide wireless connectivity to a high data-rate network and perhaps to the Internet, while the BT NIC 330 provides a low data-rate connection to devices such as cellular/PCS telephones, personal digital assistants, printers, etc.

FIG. 3 displays the digital device 310 communicating with other stations 340 and 350 from an 802.11 wireless LAN and other slaves 360 and 370 from a BT network. FIG. 3 does not display an 802.11 access point or a BT master. It is conceivable that the digital device 310 contain an 802.11 access point or a BT master or both, although according to the present invention, it does not have to contain either.

Although BT networks use a frequency hopping transmission mechanism that changes transmission frequency after each time slot, collisions between BT and 802.11 wireless networks can and do occur. This is in part due to the wide spectral footprint of the 802.11 wireless network, where the entire 2.4 GHz ISM band can only support three different communications channels. Therefore, at any given time, an 802.11 wireless network occupies a full one-third of the communications band.

Figure 4:
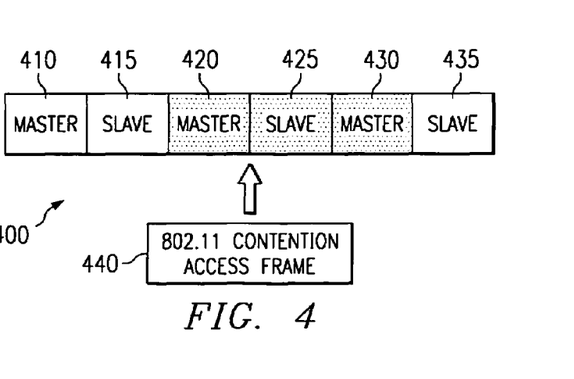
FIG. 4 illustrates a collision between a Bluetooth transmission stream and an IEEE 802.11 frame.

Referring now to FIG. 4, a diagram illustrates a collision between a BT time-division duplex time slot stream and an 802.11 data frame. FIG. 4 displays an alternating sequence of BT master→slave and slave→master time slots (slots 410, 415, 420, 425, 430, and 435). Also displayed is a single 802.11 frame 440. The frame 440 is transmitted using contention access, where the station is free to transmit if it senses that the medium is idle and its back-off timer is at zero. If there had been data in master→slave time slot 420, the 802.11 frame 440 would not have been transmitted. But since the 802.11 frame 440 was transmitted, the BT slots 420, 425, and 430 cannot be used to transmit or receive data. Additionally, since BT networks do not require checking medium status prior to transmission, the BT master may transmit in the master→slave slot 430. If it does, then chances are high that the 802.11 frame 440 will be corrupted. Therefore, a mechanism is needed to coordinate transmissions of the wireless networks, especially when they are collocated in a single digital device.

A solution to multiple collocated wireless networks can be as simple as periodically turning the wireless networks on and off. While one wireless network is on, the other wireless networks are off. This solution has an advantage of ease in implementation. However, turning a network on and off has significant overhead costs such as in re-training the network when it is powered back on. Additionally, turning a network off and then turning another network on can be wasteful if the network being turned on has no transmissions to send.

Alternatively, multiple wireless networks can collocate if they know when they can and cannot transmit. Because when one wireless NIC in a digital device transmits it often "blinds" any other wireless NICs in the same digital device, many problems can be alleviated if wireless NICs know when one another is transmitting or receiving. A way to share the transmission and receiving information is to provide it to a centralized controller. The centralized controller can then maintain a schedule of transmissions. The centralized controller can be further extended to include a reservation system where a wireless NIC can request transmission permission prior to transmitting. If the permission is not granted, the wireless NIC will not transmit.

Figure 5:
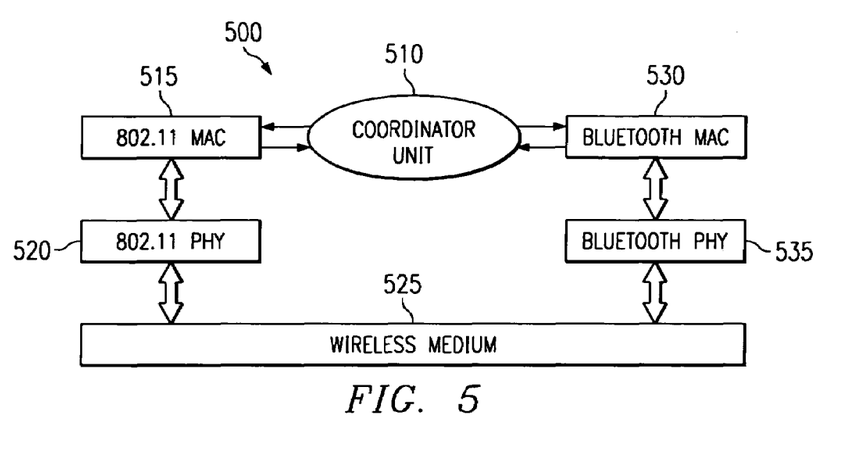
FIG. 5 illustrates a coordinator unit, coordinating transmissions between an IEEE 802.11 wireless local area network and a Bluetooth wireless network according to a preferred embodiment of the present invention.

Referring now to FIG. 5, a diagram illustrates a coordinator unit (CU) 510 for controlling transmissions for collocated wireless networks according to a preferred embodiment of the present invention. According to a preferred embodiment of the present invention, the CU 510 is located in the digital device 310 with the collocated wireless networks. If the CU 510 is located in the digital device, then the CU 510 is preferably coupled to the wireless network NICs via a wired connection. In another preferred embodiment of the present invention, the CU 510 is coupled to each of the wireless network NICs by a separate wired connection.

Alternatively, the CU 510 may be external to the digital device 310 and coupled to the digital device 310 via some type of physical connection, either wired or wireless. If the coupling is wireless, then ideally, the wireless connections should be at a different operating frequency from the operating frequency of the collocated wireless networks. In another preferred embodiment of the present invention, each wireless connection between the CU 510 and the wireless network NICs uses a different operating frequency. The purpose of being directly connected to the digital device with multiple collocated wireless networks rather than sharing the same wireless network connections is that the CU 510 may immediately receive messages from the wireless network NICs without encountering the problem of wireless messages colliding, i.e., the same problems that it is trying to solve.

The CU 510 is coupled to an 802.11 media access control (MAC) layer 515, which in turn is coupled to an 802.11 physical (PHY) layer 520, which is coupled to a wireless medium 525. The CU 510 is also coupled to a BT MAC layer 530. Similarly to the 802.11 side of picture, the BT MAC layer 530 is coupled to a BT PHY layer 535, which in turn is coupled to the wireless medium 525. In general, a MAC layer is responsible for scheduling protocols and access control procedures to accomplish the delivery of data units, while a PHY layer controls such things as physical layer signaling techniques and interface functions for the wireless medium.

The CU 510 receives reservation requests from either the 802.11 MAC 515 or the BT MAC 530 or both or any other wireless network's MAC layer to which it may be coupled. When the CU 510 receives the reservation request, the CU 510 examines the scheduled transmissions and will grant the reservation request if there are no scheduled transmissions during the same time period. According to a preferred embodiment of the present invention, the CU 510 calculates a start time and a stop time for the reservation request, based on information provided in the reservation request, and compares the start and stop times with a list of granted reservation start and stop times.

In a situation when the wireless networks are busy, multiple reservation requests may arrive at approximately the same time (e.g., a subsequent reservation request arrives for an overlapping time period before a first reservation request can be processed). Should multiple reservation requests for the same time period occur, the CU 510 can use a probabilistic virtual contention mechanism for collision resolution to resolve the conflicting requests. A discussion of the probabilistic virtual contention mechanism for collision resolution will be presented below. Once the CU 510 has scheduled a reservation request, it returns a reservation to the requesting MAC. If the requesting MAC does not receive a reservation for its reservation request, the corresponding wireless network is not able to transmit.

Figure 6A:
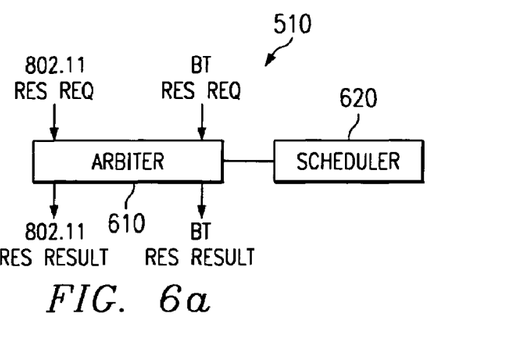
FIG. 6a illustrates a functional view of the coordinator unit displayed in FIG. 5 according to a preferred embodiment of the present invention.

Referring now to FIG. 6a, a diagram provides a more detailed view of the CU 510 according to a preferred embodiment of the present invention. The CU 510 comprises an arbiter unit 610 and a scheduler unit 620. Not shown, but also part of the CU 510 is a reservation request flag line. The reservation request flag line is a status line from the scheduler unit 620 to the arbiter unit 610 and reports the status of the pending reservation request. The arbiter unit 610 receives the reservation requests from the various wireless networks and if there are no conflicting requests, forwards the reservation requests to the scheduler unit 620 where they are scheduled and granted (if possible) or rejected (if not possible). The scheduler unit 620 uses the reservation request flag line to return the results of the pending reservation request to the arbiter unit 610. The arbiter unit 610 returns the results to the requesting wireless network.

The scheduler unit 620 maintains a list of the reservations that it has granted and when a new reservation comes in, it checks the new reservation against its list of existing reservations. If the time requested is free, then the scheduler unit 620 will grant the reservation and insert the reservation into its list. If the time requested is not available, then the scheduler unit 620 will reject the reservation request.

If there are multiple pending requests for a reservation that spans a common time period, i.e., a conflicting reservation, the arbiter unit 610 must decide which request to grant and which request to reject. According to a preferred embodiment of the present invention, the arbiter unit 610 uses a probabilistic mechanism referred to as virtual contention for collision resolution to decide which reservation request is granted. Virtual contention follows a specific set of rules and probabilities.

Figure 6B:
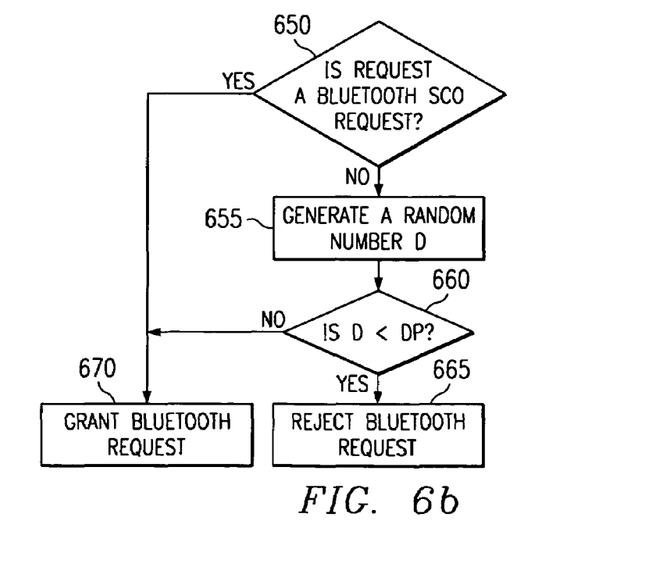
FIG. 6b illustrates a flow diagram detailing a virtual contention algorithm for collision resolution according to a preferred embodiment of the present invention.

Referring now to FIG. 6b, a diagram illustrates an algorithm for granting reservation requests from conflicting reservations requests according to a preferred embodiment of the present invention. The algorithm is also referred to as the virtual contention for collision resolution algorithm. If the reservation request is from a BT SCO transmission (block 650), then the BT SCO transmission is granted. Virtual contention gives BT SCO transmissions the highest priority and grants BT SCO transmission reservation requests over other requests. For remaining transmission types, the following decision is performed should conflicting reservation requests be made. The arbiter unit 610 selects a random number, D, from the range of [0, 1) (block 655). The arbiter unit 610 then compares the random number, D, with a prespecified value, $D_p$ (block 660). $D_p$ is a threshold value ranging from [0, 1]. If D is>=$D_p$, then grant the BT request and reject the 802.11 request (block 670). If D is<$D_p$, then reject the BT request (block 665).

According to a preferred embodiment of the present invention, if there are more than two pending requests in a conflicting reservation (for the case when there are more than two collocated wireless networks), then the virtual contention collision resolution algorithm generates a random number from a range [0, 1). This random number is then compared with a threshold, $D_p$, which has N−1 numbers, where N is the number of wireless networks involved in the conflicting reservation request. The reservation request is given to the wireless network based on where the random number falls in the threshold.

As an example of the virtual contention collision resolution algorithm for a situation with more than two conflicting reservation requests, let there be three conflicting reservation requests in a digital device with four collocated wireless networks. The virtual contention collision resolution algorithm would then generate a random number, D, which lies in the range [0, 1). The random number, D, is then compared against a threshold, $D_p$, which has two number, N1 and N2. The values of the numbers in the threshold, $D_p$, can be prespecified values and they may or may not be dynamically adjustable to meet current network performance conditions. According to a preferred embodiment of the present invention, a range [0, N1) would be assigned to conflicting wireless network number 1, a range [N1, N2) would be assigned to conflicting wireless network number 2, and a range [N2, 0] would be assigned to conflicting wireless network number 3. Then, depending on which assigned range the random number, D, lies, the assigned conflicting wireless network would be granted the reservation. The above is an example and the actual assignment of the ranges to conflicting wireless networks may be different based on system design decisions, current network performance issues, etc.

According to another preferred embodiment of the present invention, the value of $D_p$, though initially prespecified, can be adjusted to meet changing network conditions and performance preferences. The CU 510 may be able to monitor network performance and if it notices an imbalance in one wireless networks' performance, the arbiter unit 610 can adjust the value of $D_p$ to more fairly balance the wireless networks' performance. Alternatively, the CU 510 may be commanded to effectively prevent one wireless network's transmissions if another wireless network has a transmission at the same time. The arbiter unit 610 may the adjust the value of $D_p$ to a value such that it will always grant a reservation request to the preferred wireless network should there be a conflicting request.

As discussed previously, there are two types of wireless stations in an 802.11 wireless LAN (a wireless station and an access point) and there are two types of wireless stations in a BT wireless network (a master unit and a slave unit). Algorithms for requesting reservation requests and handling request rejections differ according to the particular type of wireless station the digital device with the collocated wireless networks happens to be. Optimally, scheduling would be most readily accomplished and the best performance would be achieved if the digital device had both an 802.11 access point and a BT master unit. This is due to the fact that the 802.11 access point controls communications during the contention-free period in the 802.11 network and the BT master unit controls all communications in the BT network. This particular configuration minimizes the occurrence of receiving unexpected packets.

Figure 7A:
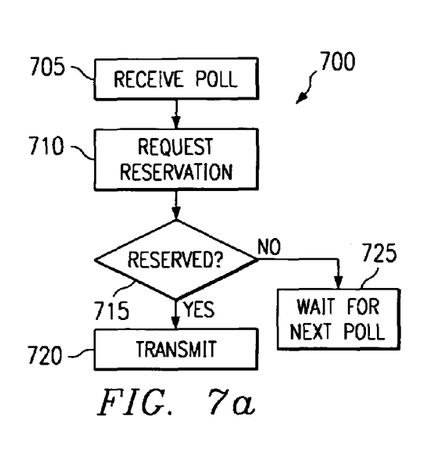
FIG. 7a illustrates an algorithm for requesting reservation requests and processing request rejections when the digital device contains an 802.11 wireless station as one of the collocated wireless networks, when the 802.11 wireless local area network is operating in contention-free mode according to a preferred embodiment of the present invention.

Referring now to FIG. 7a, a diagram illustrates an algorithm 700 for requesting reservation requests and processing request rejections when the digital device contains an 802.11 wireless station as one of the collocated wireless networks according to a preferred embodiment of the present invention. The algorithm 700 executes on the 802.11 wireless station when the 802.11 wireless network is operating in contention-free mode.

The wireless station remains idle until it receives a poll-frame from the 802.11 access point (block 705). As discussed previously, a wireless station operating in contention-free mode cannot transmit any frames unless it first receives a poll-frame from the 802.11 access point. When the wireless station receives the poll-frame, it will immediately send a reservation request to the CU 510 (block 710). The reservation request will request a transmission time that begins immediately and last for a duration that is specified in the poll-frame from the 802.11 access point. The CU 510, knowing that the wireless station is operating in contention-free mode, will give the reservation request high priority and will grant the reservation request unless there is already some outstanding request for the time period specified in the request.

In block 715, the wireless station checks to see if its request has been granted. If the request has been granted, then the wireless station can transmit. If the request has not been granted, the wireless station cannot transmit and the chance to transmit is wasted. The wireless station must wait until it receives another poll-frame from the access point prior to requesting another reservation from the CU 510.

Figure 7B:
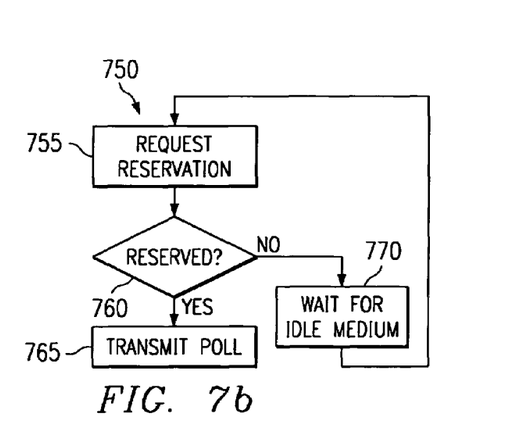
FIG. 7b illustrates an algorithm for requesting reservation requests and processing request rejections when the digital device contains an 802.11 access point as one of the collocated wireless networks, when the 802.11 wireless local area network is operating in contention-free mode according to a preferred embodiment of the present invention.

Referring now to FIG. 7b, a diagram illustrates an algorithm 750 for requesting reservation requests and processing request rejections when the digital device contains an 802.11 access point as one of the collocated wireless networks according to a preferred embodiment of the present invention. The algorithm 750 executes on the 802.11 access point when the 802.11 wireless network is operating in contention-free mode.

In contention-free mode, an 802.11 access point transmits a poll-frame to a wireless station, granting the wireless station permission to transmit for a time duration specified in the poll frame. Due to the fact that the 802.11 access point controls the initiation of the frame exchange sequence, the 802.11 access point knows exactly when the transmissions will commence. Hence, prior to transmitting the poll-frame, the 802.11 access point sends a reservation request to the CU 510 (block 755) for a reservation that begins immediately and lasts for a period of time equal to the amount of time required for the 802.11 access point to transmit the poll-frame plus the time duration specified in the poll-frame.

After sending the reservation request in block 755, the 802.11 access point will check to see if its request has been granted (block 760). If the request has been granted, then the 802.11 access point can transmit the poll-frame (block 765). If the request has not been granted, the 802.11 access point cannot transmit the poll-frame and must wait until a next available transmission time and request another reservation (block 770). The next available transmission time may be the next time that the transmission medium becomes idle.

Figure 8:
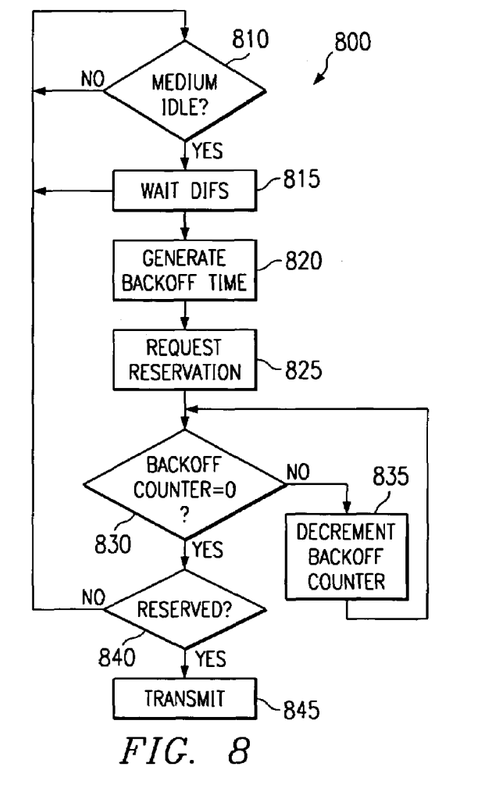
FIG. 8 illustrates an algorithm for requesting reservation requests and processing request rejections when the digital device contains an 802.11 access point or 802.11 wireless station as one of the collocated wireless networks, when the 802.11 wireless local area network is operating in contention access mode according to a preferred embodiment of the present invention.

Referring now to FIG. 8, a diagram illustrates an algorithm 800 for requesting reservation requests and processing request rejections when the digital device contains an 802.11 wireless station or an 802.11 access point as one of the collocated wireless networks according to a preferred embodiment of the present invention. The algorithm 800 executes on the 802.11 wireless station or 802.11 access point when the 802.11 wireless network is operating in the contention period. When the 802.11 wireless network is operating in the contention period, both the wireless station and the access point operates in a similar fashion and will be generically referred to as a station.

The algorithm 800 begins when the station has some frames to transmit. When the station has frames to transmit, the station first checks to see if the medium is idle (block 810). If the medium is not idle, then the station will continue to wait until the medium becomes idle. Once the medium becomes idle, the station must wait an additional DIFS period (block 815). The additional wait is to ensure that any frames that were delayed due to processing or signal propagation delays have had a chance to be detected by all wireless stations in the 802.11 network.

If the medium remains idle for the additional DIFS period (block 815), then the station generates a random backoff time (block 820). The random backoff time is a probabilistic load distribution method specified for in the IEEE 802.11 technical standards. The actual methodology used in generating the backoff time is beyond the scope of the present invention. With the backoff time in hand, the station sends a reservation request to the CU 510 (block 825) for a reservation starting at the current time plus the backoff time for a duration equal to the size of the frames that it wishes to transmit plus some miscellaneous time for overhead.

After requesting the reservation, the station begins a backoff process (blocks 830 and 835). The station begins the backoff process by loading the backoff time into a backoff counter. The station checks to see if the backoff counter is equal to zero (block 830). If the backoff counter is not equal to zero, then the station waits for the expiration of a network time slot and decrements the value in the backoff counter by one if the expired network time slot was idle (block 845). The backoff process continues until the backoff counter reaches zero.

Once the backoff counter reaches zero, the station checks to see if its reservation request had been granted (block 840). If the request was granted, then the station is free to transmit (block 845). If the request was denied, then the station cannot transmit and station begin the entire backoff procedure once again with a new random backoff time In a BT wireless network, there are two distinct operating modes, SCO and ACL. Both operating modes are actually quite similar and only several minor differences differentiate the two modes. In both SCO and ACL, a BT master unit initiates the transmission and a slave unit cannot transmit unless it was specifically addressed by the BT master unit. SCO differs from ACL in that SCO transmissions are scheduled well in advance and is directed to a single slave unit. As a result of the similarities, a single algorithm (one for the master unit and one for the slave units) for requesting reservation requests and processing request rejections is sufficient for both operating modes.

Figure 9A:
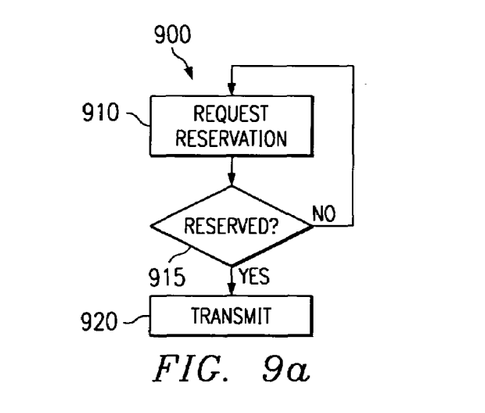
FIG. 9a illustrates an algorithm for requesting reservation requests and processing request rejections when the digital device contains a BT master unit as one of the collocated wireless networks according to a preferred embodiment of the present invention.

Referring now to FIG. 9a, a diagram illustrates an algorithm 900 for requesting reservation requests and processing request rejections when the digital device contains a BT master unit as one of the collocated wireless networks according to a preferred embodiment of the present invention. The algorithm 900 executes on the BT master unit when the BT wireless network is operating in either SCO or ACL modes.

In a BT wireless network, the master unit initiates all transmissions. Therefore, if the collocated network device is a master unit, the scheduling of transmissions is a relatively simple matter. When the master unit is scheduling SCO transmissions, it may simply schedule an entire sequence of SCO transmissions at one time. This is possible because SCO transmissions are periodic. According to a preferred embodiment of the present invention, BT SCO transmissions are of the highest priority and will be granted over any conflicting reservation requests.

For a SCO transmission, the BT master unit sends a reservation request to the CU 510 for a master→slave time slot and a slave→master time slot pair at a specified time (block 910). The master unit then checks to see if the reservation request has been granted (block 915). If the request has been granted, then the master unit is free to transmit when the requested time slot arrives. If the request was rejected, then the master unit will request the next available master→slave and slave→master time slot pair. Since the SCO transmissions are given the highest priority, the SCO requests are typically granted.

For ACL transmissions, there are two possibilities. There is a directed ACL transmission, where a slave unit is specifically addressed and a response from the addressed slave unit is expected. In this case, the algorithm 900 executes in the same manner as for a SCO transmission as described above. There is also a broadcast ACL transmission, where no slave unit is specifically addressed and no response is expected. In this case, the algorithm 900 requests a reservation for a master→slave time slot only and no slave→master time slot is requested. However, the steps taken by the algorithm 900 are the same as described above.

Figure 9B:
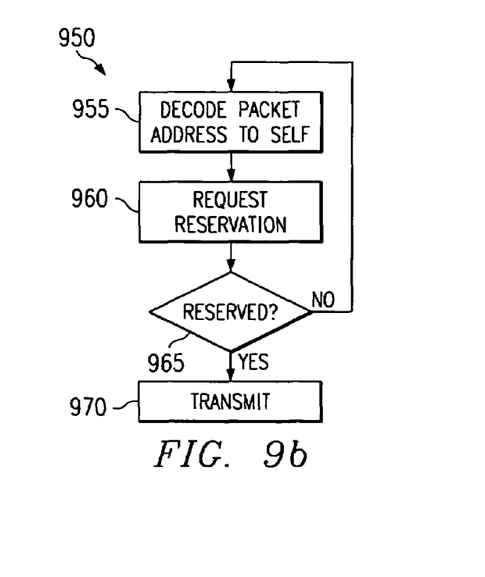
FIG. 9b illustrates an algorithm for requesting reservation requests and processing request rejections when the digital device contains a BT slave unit as one of the collocated wireless networks according to a preferred embodiment of the present invention.

Referring now to FIG. 9b, a diagram illustrates an algorithm 950 for requesting reservation requests and processing request rejections when the digital device contains a BT slave unit as one of the collocated wireless networks according to a preferred embodiment of the present invention. The algorithm 950 executes on the BT slave unit when the BT wireless network is operating in either SCO or ACL modes.

In a BT wireless network, a slave unit can only transmit when it decodes a transmission that is specifically addressed to it. It is expected that the slave unit transmit a response to a transmission addressed to it in the next slave→master time slot immediately after the slave receives the initial transmission. Therefore, there is a certain level of urgency that the slave be granted a reservation request when it requests for one.

The algorithm 950 begins after the slave unit decodes a transmission that is specifically addressed to it (block 955). The slave unit sends a reservation request to the CU 510 for the next slave→master time slot (block 960). Since master→slave and slave→master time slots alternate in a BT network, the next slave→master time slot is the slot immediately following the time slot that carried the transmission to the slave unit. The slave unit checks to see if the request has been granted in block 965. If the request was granted, then the slave unit is free to transmit in block 970. If the request was rejected, then the slave unit will have to wait for being addressed by the master again before making another reservation.

According to a preferred embodiment of the present invention, there is a request counter that maintains a count of how many times a particular request from a particular requester has been rejected. Once the count exceeds a specified threshold, then the request may be marked as a failed request and can no longer be requested. According to another preferred embodiment of the present invention, as the request counter increases, the priority is also increased. By increasing the priority granted a request, the probability of the request being granted will also increase.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for controlling access to a wireless communications medium shared by a plurality of collocated wireless networks comprising:
   receiving a plurality of reservation requests at a coordinator unit from collocated wireless networks for transmission on the communications medium;
   selected a random number, D;
   comparing the random number against a threshold, DP;
   granting a reservation request from the plurality of reservation requests based on the comparison; and
   returning the results of the decision to wireless networks sending the plurality of reservation requests.

2. The method of claim 1, wherein the deciding step further comprises:
   determining if a desired time specified in the reservation request is available;
   granting the reservation request if the desired time is available; and
   rejecting the reservation request if the desired time is not available.

3. The method of claim 2, wherein the determining step further comprises:
   generating a start time and a stop time for the reservation request based on information provided in the reservation request; and
   comparing the start time and the stop time for the reservation request against a list of granted start and stop times.

4. The method of claim 1, wherein the receiving step comprises receiving a single reservation request from one collocated wireless network.

5. The method of claim 1, wherein the plurality of reservation requests are for an overlapping transmission time.

6. The method of claim 1, further comprises the step of rejecting all remaining reservation requests from the plurality of reservation requests.

7. The method of claim 6, wherein the returning step comprises returning a granted reservation request to a collocated wireless network whose reservation request was granted and returning rejected reservation requests to collocated wireless networks whose reservation requests were rejected.

8. The method of claim 1, wherein there are two collocated wireless networks, and wherein the threshold, DP, is a number between 0 and 1.

9. The method of claim 1, wherein there are three collocated wireless networks, and wherein the threshold, DP, is a set of two numbers between 0 and 1.

10. The method of claim 1, wherein the reservation request comprises a transmit start time and a transmit duration.

11. The method of claim 1, wherein the reservation request comprises a transmit start time and a transmit stop time.

12. A method for sharing a wireless communications medium among a plurality of collocated wireless networks comprising:
 (a) determining a need to transmit;
 (b) sending a reservation request to a coordinator unit;
 (c) transmit if the reservation request was granted; and
 (d) deferring transmission if the reservation request was rejected, herein the reservation request is granted by the coordinator unit based on a comparison of a random number and a predetermined threshold.

13. The method of claim 12, wherein the determining step comprises decoding a message addressed to self that requires a response.

14. The method of claim 12, wherein the determining step comprises receiving a message addressed to self that grants permission to transmit.

15. The method of claim 12, wherein the determining step comprises the assertion of a transmit indicator for transmission of a periodic transmission.

16. The method of claim 12, wherein the determining step comprises servicing a request to grant permission to transmit.

17. The method of claim 13, wherein the determining step further comprises:
 determining that the wireless communications medium is idle;
 waiting a specified time interval;
 generating a random backoff time;
 loading the random backoff time into a backoff timer;
 decrementing the backoff tinier each time an idle network slot expires; and
 determining when the backoff timer reaches zero.

18. The method of claim 12, wherein the deferring step further comprises:
 waiting until a next available transmission time; and
 repeating steps (b)–(d).

19. The method of claim 12, wherein the deferring step further comprises:
 sending a reservation request to the coordinator unit, requesting a next available time; and
 repeating steps (c)–(d).

20. The method of claim 12, wherein the deferring step comprises repeating steps (a)–(d).

* * * * *

UNITED STATES PATENT AND TRADEMARK OFFICE
CERTIFICATE OF CORRECTION

PATENT NO. : 7,099,671 B2  
APPLICATION NO. : 10/011221  
DATED : August 29, 2006  
INVENTOR(S) : Jie Liang Page 1 of 1

It is certified that error appears in the above-identified patent and that said Letters Patent is hereby corrected as shown below:

Title Page
(22)   Filed: "October 21, 2001"; should be --October 25, 2001-- (as marked on attached Official Filing Receipt).

(63)   Prior Publication Data - add the following:

US 2003-0083095 A1 published 05/01/2003  
US 2005-0239474 A9 published 10/27/2005

Signed and Sealed this

Twenty-sixth Day of August, 2008

JON W. DUDAS  
*Director of the United States Patent and Trademark Office*